(12) United States Patent
Ha et al.

(10) Patent No.: US 9,060,069 B2
(45) Date of Patent: Jun. 16, 2015

(54) APPARATUS AND METHOD FOR CONNECTING WITH BLUETOOTH DEVICES IN A TERMINAL USING AUDIO CHANNEL

(75) Inventors: Ki-Woong Ha, Suwon-si (KR); Tae-Yong Park, Seongnam-si (KR); Eun-Chul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 726 days.

(21) Appl. No.: 12/534,360

(22) Filed: Aug. 3, 2009

(65) Prior Publication Data

US 2010/0130131 A1 May 27, 2010

(30) Foreign Application Priority Data

Nov. 21, 2008 (KR) ........................ 10-2008-0116082

(51) Int. Cl.
  *H04M 1/00* (2006.01)
  *H04M 1/725* (2006.01)
  *H04M 1/60* (2006.01)
  *H04W 48/08* (2009.01)
  *H04W 76/02* (2009.01)
  *H04W 84/18* (2009.01)

(52) U.S. Cl.
  CPC .......... *H04M 1/7253* (2013.01); *H04M 1/6066* (2013.01); *H04W 48/08* (2013.01); *H04W 76/02* (2013.01); *H04W 84/18* (2013.01)

(58) Field of Classification Search
  USPC ............ 455/450, 456.4, 41.2, 41.3, 513, 557, 455/569.1, 569.2
  See application file for complete search history.

(56) References Cited

U.S. PATENT DOCUMENTS

| 8,055,194 | B2 | 11/2011 | Kim | |
|---|---|---|---|---|
| 2007/0178944 | A1* | 8/2007 | Mitsuru et al. | 455/569.1 |
| 2007/0202808 | A1* | 8/2007 | Kim | 455/41.2 |
| 2007/0211907 | A1* | 9/2007 | Eo et al. | 381/79 |
| 2007/0287381 | A1* | 12/2007 | Hulvey | 455/41.2 |
| 2008/0146151 | A1* | 6/2008 | Lyu et al. | 455/41.2 |
| 2009/0031251 | A1* | 1/2009 | Kessler et al. | 715/810 |
| 2010/0203830 | A1* | 8/2010 | Warren et al. | 455/41.2 |

FOREIGN PATENT DOCUMENTS

| KR | 10-0703330 B1 | 3/2007 |
|---|---|---|
| KR | 10-0754210 B1 | 9/2007 |
| KR | 1020080056525 A | 6/2008 |
| KR | 10-2009-0047144 A | 5/2009 |

* cited by examiner

*Primary Examiner* — Ping Hsieh
(74) *Attorney, Agent, or Firm* — Jefferson IP Law, LLP (57) ABSTRACT

An apparatus and method for connecting with Bluetooth devices in a terminal using an audio channel are provided. The method includes distinguishing an audio Bluetooth hands-free device and a non-audio Bluetooth hands-free device, performing a connection with two Bluetooth hands-free devices by connecting with the non-audio Bluetooth hands-free device and the audio Bluetooth hands-free device in a regular sequence, upon a change of a control state of the terminal, transmitting state information to the two Bluetooth hands-free devices, and, upon call connection, sending a request for a connection of an audio channel to the audio Bluetooth hands-free device.

14 Claims, 4 Drawing Sheets

FIG.3F

APPARATUS AND METHOD FOR CONNECTING WITH BLUETOOTH DEVICES IN A TERMINAL USING AUDIO CHANNEL

PRIORITY

This application claims the benefit under 35 U.S.C. §119(a) of a Korean patent application filed in the Korean Intellectual Property Office on Nov. 21, 2009 and assigned Serial No. 10-2008-0116082, the entire disclosure of which is hereby incorporated by reference.

BACKGROUND OF THE INVENTION

1. Field of the Invention

The present invention relates to a terminal using an audio channel. More particularly, the present invention relates to an apparatus and method for connecting with Bluetooth devices in a terminal using an audio channel.

2. Description of the Related Art

Bluetooth, one of technologies for performing a local wireless communication, realizes communication between terminals existing within a short range of each other and between a terminal and a Bluetooth device, using an Industrial Scientific Medical (ISM) band of 2.4 GHz. For example, a portable terminal can provide a variety of services using the Bluetooth technology, such as a wireless headset, printing, file transmission, etc.

In a terminal having a telephone call function such as a portable phone, the Bluetooth technology is most widely used to realize a hands-free device. Conventionally, a Bluetooth hands-free device used in a portable phone has audio characteristics to support a telephone call. Accordingly, the Bluetooth hands-free device is allocated an audio channel. In other words, upon connection with the Bluetooth hands-free device, the portable phone has to allocate the audio channel. Because of this, the portable phone cannot simultaneously connect with a plurality of Bluetooth hands-free devices.

In recent years, a Bluetooth hands-free device for the purpose of only a control of a host terminal without audio characteristics has been developed. For example, in a portable phone, a user can remotely control a function of transmission/reception of a short message of a host terminal, a phonebook, etc., through a Bluetooth hands-free device for the purpose of control (i.e. a non-audio Bluetooth hands-free device). Thus, the non-audio Bluetooth hands-free device does not occupy an audio channel. That is, if the non-audio Bluetooth hands-free device is connected, it is in a state where the audio channel is not allocated. However, because a host terminal cannot simultaneously connect with a plurality of Bluetooth hands-free devices, the host terminal cannot connect with a different audio Bluetooth hands-free device. That is, there is a problem that, if a non-audio Bluetooth hands-free device is connected, despite that an audio channel is in a non-occupied state, a user cannot use a different audio Bluetooth hands-free device, and has to directly make a call using a host device.

SUMMARY OF THE INVENTION

An aspect of the present invention is to address at least the above-mentioned problems and/or disadvantages and to provide at least the advantages described below. Accordingly, an aspect of the present invention is to provide an apparatus and method for additionally connecting with an audio Bluetooth hands-free device in conditions in which a Bluetooth hands-free device for the purpose of control (i.e. a non-audio Bluetooth hands-free device) is connected, in a terminal using an audio channel.

Another aspect of the present invention is to provide an apparatus and method for reducing a time required to connect with a Bluetooth hands-free device in a terminal using an audio channel.

A further aspect of the present invention is to provide an apparatus and method for attempting to connect with a Bluetooth hands-free device with a high probability of a connection success in a terminal using an audio channel.

Yet another aspect of the present invention is to provide an apparatus and method for pairing with Bluetooth hands-free devices using previously stored pin codes in a terminal using an audio channel.

The above aspects are addressed by providing an apparatus and method for connecting with Bluetooth devices in a terminal using an audio channel.

In accordance with an aspect of the present invention, a method for connecting with Bluetooth hands-free devices in a terminal using an audio channel is provided. The method includes distinguishing an audio Bluetooth hands-free device and a non-audio Bluetooth hands-free device using Classes Of Device (COD) of Bluetooth devices responding to an inquiry, performing a connection with two Bluetooth hands-free devices by connecting with the non-audio Bluetooth hands-free device and the audio Bluetooth hands-free device in a regular sequence, upon a change of a control state of the terminal, transmitting state information to the two Bluetooth hands-free devices, and, upon call connection, sending a request for a connection of an audio channel to the audio Bluetooth hands-free device.

In accordance with another aspect of the present invention, a terminal apparatus using an audio channel is provided. The apparatus includes a controller, a Bluetooth communication unit, and a Bluetooth channel manager. The controller distinguishes an audio Bluetooth hands-free device and a non-audio Bluetooth hands-free device using COD of Bluetooth devices responding to an inquiry, and performs a connection with two Bluetooth hands-free devices by connecting with the non-audio Bluetooth hands-free device and the audio Bluetooth hands-free device in a regular sequence. Upon a change of a control state of the terminal, the Bluetooth communication unit transmits state information to the two Bluetooth hands-free devices. Upon call connection, the Bluetooth channel manager sends a request for a connection of an audio channel to the audio Bluetooth hands-free device.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description is made of a technology for additionally connecting with an audio Bluetooth hands-free device in conditions in which a Bluetooth hands-free device for the purpose of control (i.e. a non-audio Bluetooth hands-free device) is connected, in a terminal using an audio channel according to an exemplary embodiment of the present invention. In the following description, the terminal represents devices that are able to have a Bluetooth function such as a cellular phone, a Personal Communication System (PCS) phone, a Personal Data Assistant (PDA) phone, an International Mobile Telecommunication-2000 (IMT-2000) terminal, etc.

A terminal according to an exemplary embodiment of the present invention determines whether a Bluetooth hands-free device has audio characteristics, in a process of connecting with the Bluetooth hands-free device. Here, a determination if a Bluetooth hands-free device has audio characteristics is made through a Class Of Device (COD) parameter that is included in a response packet of the Bluetooth hands-free device to an inquiry. In more detail, a determination if a Bluetooth device has audio capabilities is made through a bit value of a Major Service Class (MSC) that is included in the COD parameter. Also, a determination if a Bluetooth device has hands-free capabilities is made through a bit value of a Minor Device Class Field (MDCF).

If the Bluetooth hands-free device has no audio characteristics, the terminal performs pairing with the Bluetooth hands-free device without attempting to allocate an audio channel. After that, if a different Bluetooth hands-free device with audio characteristics is found, the terminal performs pairing with the found Bluetooth hands-free device with audio characteristics. Next, the terminal connects with the non-audio Bluetooth hands-free device and the audio Bluetooth hands-free device. Accordingly, upon a change of a call related state of the terminal, the terminal transmits state information to both of the connected Bluetooth hands-free devices. Upon call connection, the terminal sends a request for a connection of an audio channel to only the audio Bluetooth hands-free device.

However, because pairing is performed with a plurality of Bluetooth hands-free devices, an amount of time required until the connections are complete, in an exemplary embodiment of the present invention, increases when compared to the conventional technology. Accordingly, an exemplary embodiment of the present invention decreases the required time by simplifying a procedure of requesting a remote name and a procedure of exchanging a pin code as follows.

The procedure of requesting the remote name is described below. The remote name is Bluetooth device identification information displayed for a user. The remote name is requested of a Bluetooth device that transmits a response packet in response to an inquiry. The response packet includes information of a Bluetooth address, a page scan repetition mode, a page scan mode, a COD, a clock offset, etc. At this time, the terminal prioritizes the Bluetooth devices transmitting the responses, in an order of a magnitude of a Received Signal Strength Indicator (RSSI) of the response packet. After that, the terminal identifies a Bluetooth hands-free device among the Bluetooth devices, and sends a request for a remote name only to a Bluetooth hands-free device having the maximum RSSI (i.e., the most adjacent Bluetooth hands-free device). That is, an additional time delay resulting from a failure of remote name acquisition is prevented by sending the request for the remote name only to the adjacent Bluetooth device and, at the same time, the required time decreases by omitting a sending of a request for a remote name to a Bluetooth device having a small RSSI.

In addition, the terminal can decrease the required time, by decreasing a page time-out value for determining a failure of a remote name request. Here, the page time-out is an amount of time for waiting for a response from a corresponding Bluetooth device in response to the remote name request. If there is no response during the page time-out value, the terminal determines that the remote name request fails. Thus, if the page time-out value decreases, the terminal quickly determines that the remote name request fails, and attempts a connection with a different Bluetooth device. This leads to a decrease of a time delay in the case of the failure of the remote name request.

Next, the procedure of exchanging the pin code is described below. The pin code is information for, upon connection with a Bluetooth device, generating a type of password and encryption key. The pin codes are input from both a Bluetooth device and a host terminal during a pairing process. However, in the Bluetooth hands-free device, the pin code has been previously set. More specifically, the pin code of the Bluetooth hands-free device is set as one fixed pin code, such as '0000', '1234', etc. Accordingly, upon pairing with the Bluetooth hands-free devices, the terminal makes use of previously stored pin codes without requesting a user to input a pin code. In other words, upon pairing with the Bluetooth hands-free devices, the terminal transmits the previously stored pin codes in a regular sequence without requesting the user to input the pin code.

A construction and operation of a terminal for connecting with Bluetooth hands-free devices according to exemplary embodiments of the present invention are described below with reference to the accompanying drawings.

Figure 1:
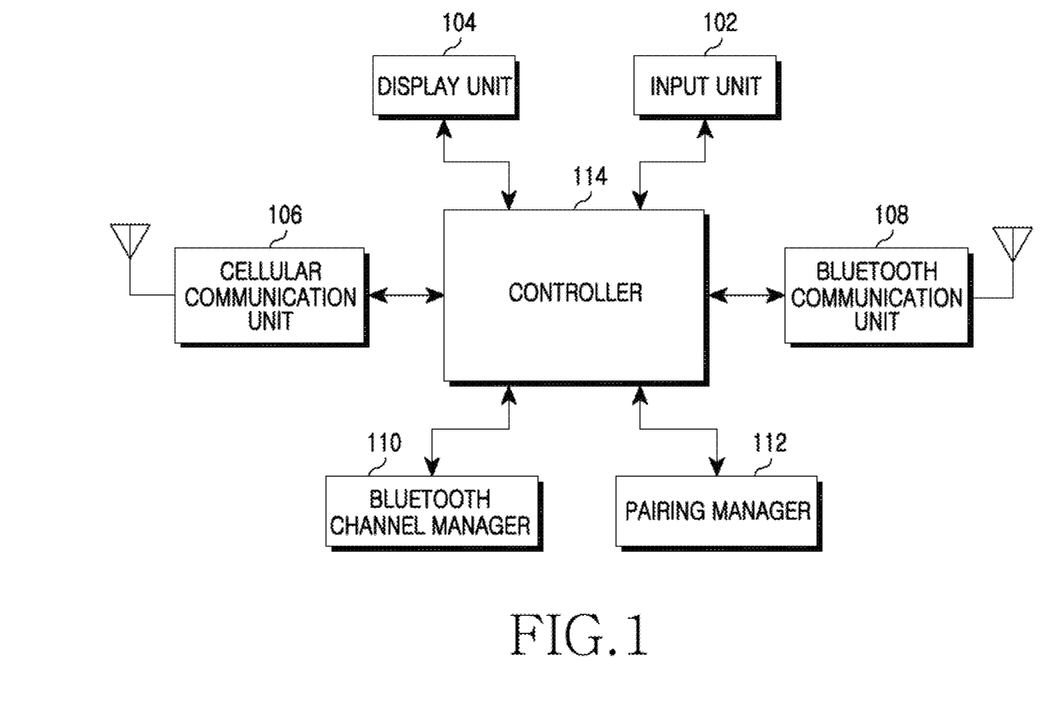
FIG. 1 is a block diagram illustrating a construction of a terminal using an audio channel according to an exemplary embodiment of the present invention.

FIG. 1 is a block diagram illustrating a construction of a terminal using an audio channel according to an exemplary embodiment of the present invention.

Referring to FIG. 1, the terminal includes an input unit 102, a display unit 104, a cellular communication unit 106, a Bluetooth communication unit 108, a Bluetooth channel manager 110, a pairing manager 112, and a controller 114.

The input unit 102 detects an input generated by a user, and provides information corresponding to the input, to the controller 114. That is, the input unit 102 processes a user's input through one or more of a keyboard, a keypad, a touch screen, a touch pad, a mouse, a special function button, etc.

The display unit 104 displays state information generated during operation of the terminal, as well as numeral, character, and video information, etc. according to execution of an application program. For example, the display unit 104 can be comprised of a Liquid Crystal Display (LCD), an Organic Light-Emitting Diode (OLED), etc.

The cellular communication unit 106 provides an interface for performing communication with a cellular system. That is, the cellular communication unit 106 performs a mutual conversion between information data and a transmission/reception signal in compliance with a standard of the cellular system. For example, the cellular communication unit 106 converts voice data for a voice call into a physical signal in accordance with a Code Division Multiple Access (CDMA) scheme, and transmits the physical signal through an antenna.

The Bluetooth communication unit 108 provides an interface for performing communication with a Bluetooth device. That is, the Bluetooth communication unit 108 performs a mutual conversion between information data and a transmission/reception signal in compliance with the Bluetooth standard. For example, when transmitting a signal, the Bluetooth communication unit 108 converts transmit data into a physical signal, and transmits the physical signal through an antenna. For example, when searching for a connectable Bluetooth device, the Bluetooth communication unit 108 transmits an inquiry packet, and identifies a response packet received from a Bluetooth device. When pairing with the Bluetooth device, the Bluetooth communication unit 108 transmits a pin code provided from the controller 114, to the Bluetooth device.

The Bluetooth channel manager 110 manages a channel used for communication with a Bluetooth device. In other words, the Bluetooth channel manager 110 allocates a channel to the Bluetooth device, and stores allocation status information on each channel. More particularly, according to an exemplary embodiment of the present invention, if a Bluetooth hands-free device is connected, the Bluetooth channel manager 110 determines whether the Bluetooth hands-free device has audio characteristics. Only if the Bluetooth hands-free device has audio characteristics, the Bluetooth channel manager 110 allocates an audio channel to the Bluetooth hands-free device. That is, upon call connection, the Bluetooth channel manager 110 sends a request for a connection of an audio channel to the audio Bluetooth hands-free device.

The pairing manager 112 stores and manages information on paired Bluetooth devices. That is, if a pairing is performed, the pairing manager 112 stores information of a remote name of the paired device, a Bluetooth address, etc., and provides the stored information on the device in response to a request of the controller 114.

The controller 114 controls general functions of the terminal. For example, the controller 114 executes a program code corresponding to a user's manipulation detected through the input unit 102, and provides video data of information to be displayed for a user, to the display unit 104. More particularly, if a dual hands-free connection mode is selected by a user's manipulation, the controller 114 performs a function of connecting with a non-audio Bluetooth hands-free device and an audio Bluetooth hands-free device.

In more detail, the controller 114 connects with the non-audio Bluetooth hands-free device and the audio Bluetooth hands-free device in a regular sequence. In more detail, the controller 114 identifies if there exists a paired Bluetooth hands-free device with reference to a list of paired Bluetooth devices stored in the pairing manager 112 and, if the paired Bluetooth hands-free device does not exist, connects with the non-audio Bluetooth hands-free device and the audio Bluetooth hands-free device through a process of Bluetooth device searching, pairing, and connection.

At this time, if a plurality of Bluetooth hands-free devices are found, the controller 114 attempts pairing with a Bluetooth hands-free device having the maximum RSSI among the plurality of Bluetooth hands-free devices. If the pairing succeeds, the controller 114 connects with the non-audio Bluetooth hands-free device. More particularly, when attempting pairing, the controller 114 attempts pairing by transmitting previously stored pin codes in a regular sequence. If the pairing using the previously stored pin codes fails, the controller 114 may display a screen for requesting a user to input a pin code through the display unit 104, and again attempts pairing using the pin code input by the user.

After connecting with the non-audio Bluetooth hands-free device and the audio Bluetooth hands-free device, upon a change of a control state, the controller 114 transmits state information to both of the connected Bluetooth hands-free devices through the Bluetooth communication unit 108. Also, upon call connection, if the Bluetooth channel manager 110 requests a connection of an audio channel, the controller 114 transmits a packet for requesting the connection of the audio channel only to the audio Bluetooth hands-free device through the Bluetooth communication unit 108.

Figure 2A:
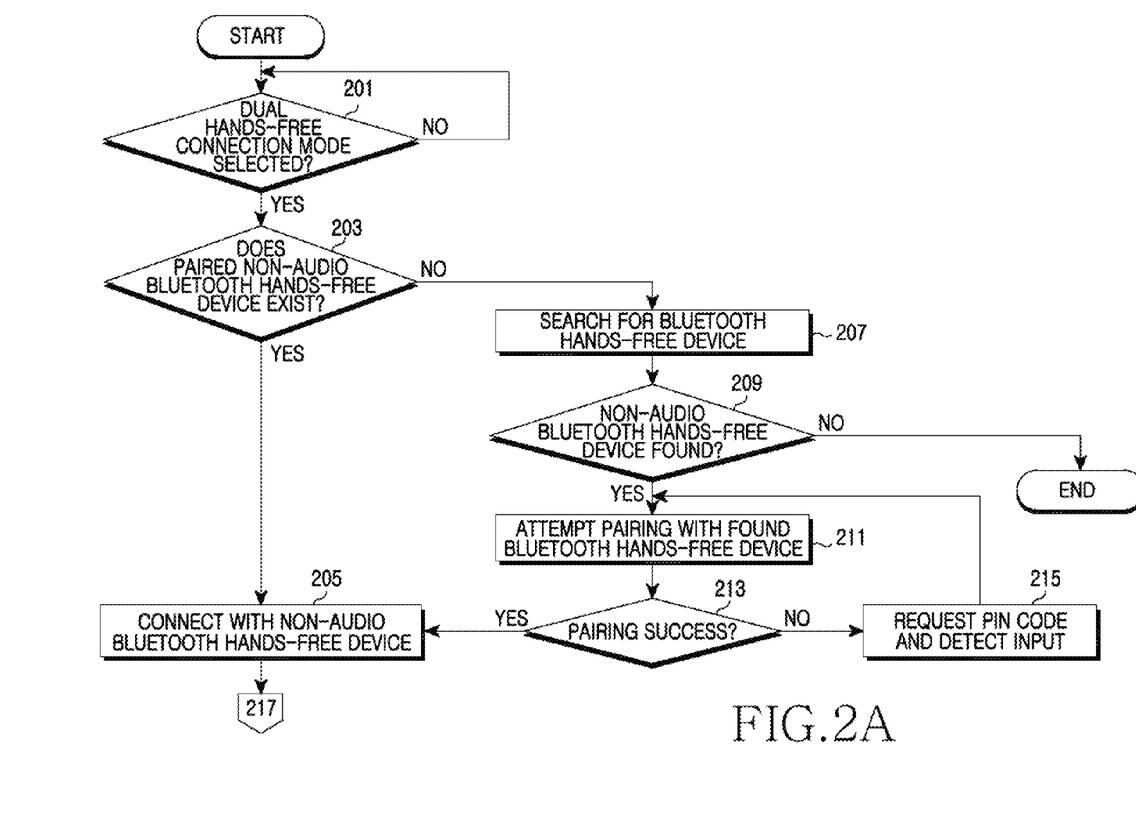
FIGS. 2A and 2B are flow diagrams illustrating an operation procedure of a terminal using an audio channel according to an exemplary embodiment of the present invention.
Figure 2B:
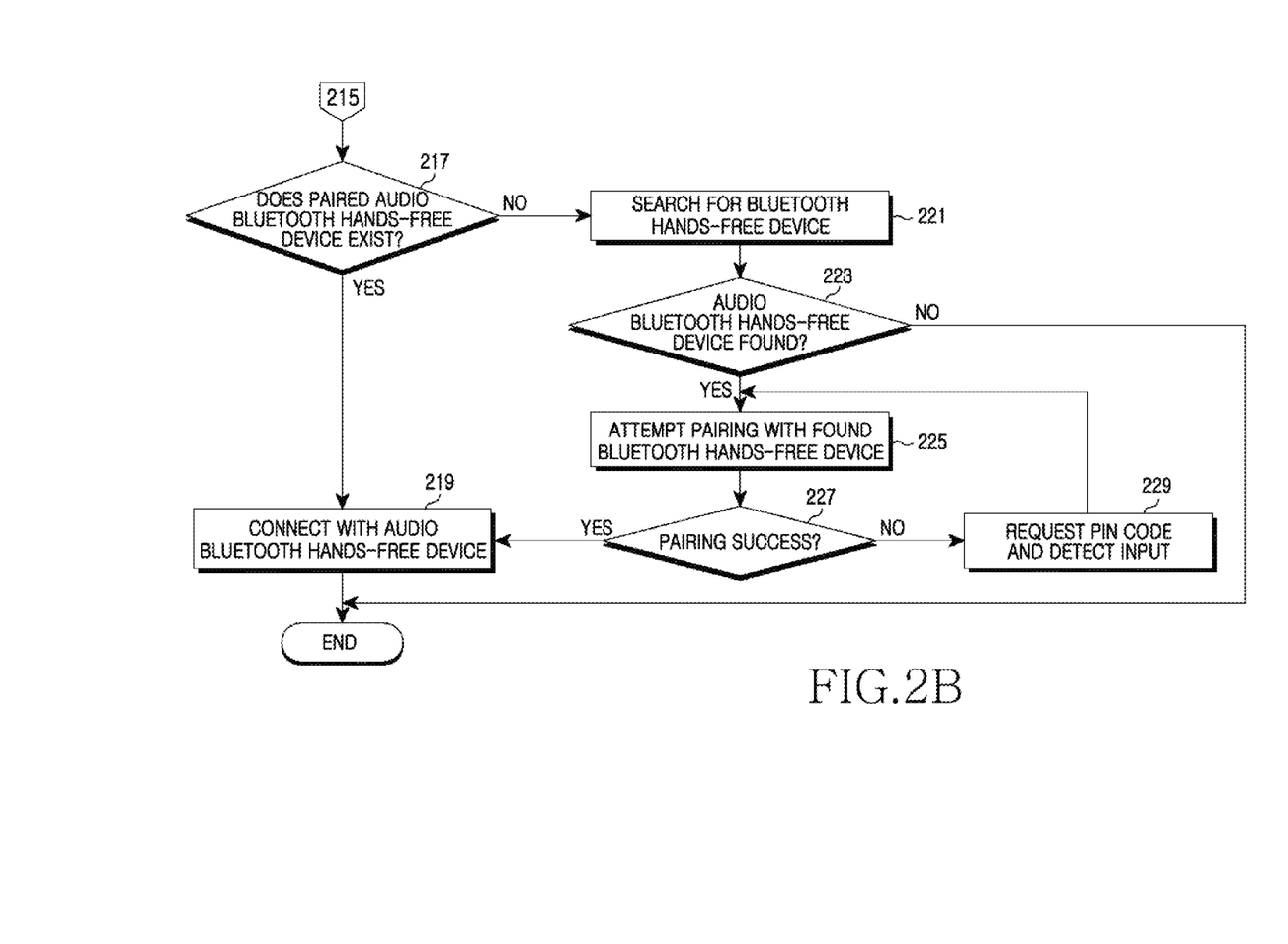

FIGS. 2A and 2B are flow diagrams illustrating an operation procedure of a terminal using an audio channel according to an exemplary embodiment of the present invention.

Figure 3A:
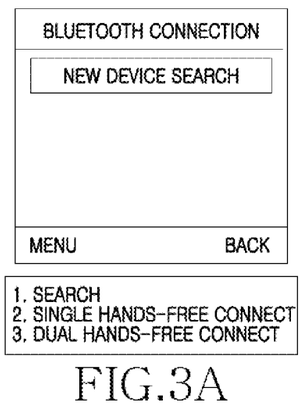
FIGS. 3A to 3F are diagrams illustrating examples of a user interface screen of a terminal using an audio channel according to an exemplary embodiment of the present invention.

Referring to FIGS. 2A and 2B, in step 201, the terminal determines whether a dual hands-free connection mode is selected by a user's manipulation. That is, the terminal may display a screen, as exemplified in FIG. 3A, and may determine whether a dual hands-free connection mode is selected by a user. The dual hands-free connection mode may be selected by the user when an item of 'dual hands-free connection' as illustrated in FIG. 3A is selected by a user.

If the dual hands-free connection mode is selected, the terminal proceeds to step 203 and determines whether a paired non-audio Bluetooth hands-free device exists. In other words, the terminal determines whether a previously paired non-audio Bluetooth hands-free device exists, by searching for a stored list of paired devices.

Figure 3B:
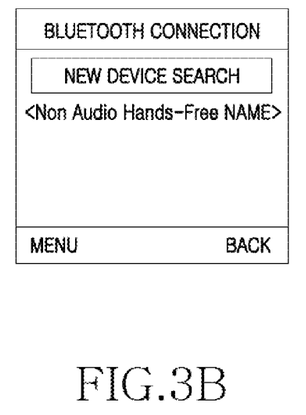

If the paired non-audio Bluetooth hands-free device exists, the terminal proceeds to step 205 and connects with the paired non-audio Bluetooth hands-free device. At this time, the terminal may display a name of the connected non-audio Bluetooth hands-free device as exemplified in FIG. 3B.

Figure 3C:
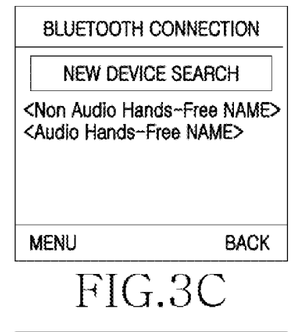
Figure 3D:
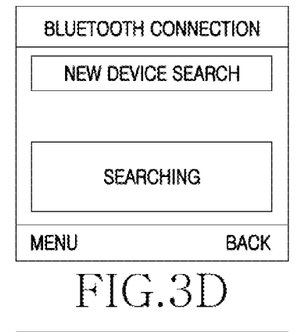

On the other hand, if the paired non-audio Bluetooth hands-free device does not exist, the terminal proceeds to step 207 and searches for connectable Bluetooth hands-free devices. That is, the terminal transmits an inquiry packet, and identifies response packets that are received. At this time, the terminal may display a screen for informing that it is searching for a device as exemplified in FIG. 3D.

Then, the terminal proceeds to step 209 and determines whether a non-audio Bluetooth hands-free device is found through the search. In other words, the terminal determines whether there is a non-audio Bluetooth hands-free device among one or more Bluetooth devices from which response packets are received. Here, the terminal determines if there is a non-audio Bluetooth hands-free device by using a COD parameter within the response packet. That is, the terminal identifies audio capabilities through a bit value of an MSC included within the COD parameter, and identifies hands-free capabilities through a bit value of an MDCF. If the non-audio Bluetooth hands-free device is not found, the terminal terminates the procedure of an exemplary embodiment of the present invention. At this time, the terminal displays a screen for informing a user that the dual hands-free connection failed.

Figure 3E:
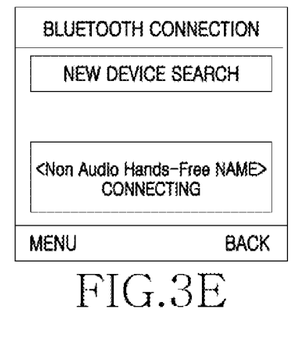

On the other hand, if the non-audio Bluetooth hands-free device is found, the terminal proceeds to step 211 and attempts pairing with the found non-audio Bluetooth hands-free device. That is, the terminal attempts pairing by successively transmitting previously stored pin codes to the found non-audio Bluetooth hands-free device. At this time, the terminal attempts pairing with a device having the maximum RSSI among the non-audio Bluetooth hands-free devices. In more detail, if a plurality of devices are found, the terminal measures an RSSI of each of the devices using a response packet and then, prioritizes the devices in order of a magnitude of the RSSI. The terminal then attempts pairing with one non-audio Bluetooth hands-free device having the maximum RSSI. At this time, the terminal may display a screen for informing that it is in pairing as exemplified in FIG. 3E.

Next, the terminal proceeds to step 213 and determines whether the pairing succeeds. If the pin code transmitted in step 211 is matched with a pin code of the non-audio Bluetooth hands-free device, the pairing succeeds and, if not matched, the pairing fails.

If the pairing fails, in step 215, the terminal sends a request for a pin code to a user, and detects the pin code input by the user. Then, the terminal returns to step 211 and again attempts pairing using the pin code input by the user.

On the other hand, if the pairing succeeds, the terminal proceeds to step 205 and connects with the found non-audio Bluetooth hands-free device.

After connecting with the non-audio Bluetooth hands-free device, the terminal proceeds to step 217 and determines whether a paired audio Bluetooth hands-free device exists. In other words, the terminal determines whether a previously paired audio Bluetooth hands-free device exists by searching a stored list of paired devices.

If the paired audio Bluetooth hands-free device exists, the terminal proceeds to step 219 and connects with the paired audio Bluetooth hands-free device. At this time, the terminal may display a name of the connected audio Bluetooth hands-free device as exemplified in FIG. 3C.

On the other hand, if the paired audio Bluetooth hands-free device does not exist, the terminal proceeds to step 221 and searches for connectable Bluetooth hands-free devices. That is, the terminal transmits an inquiry packet, and identifies response packets received. However, step 221 can be omitted if step 207 is performed.

Next, the terminal proceeds to step 223 and determines whether an audio Bluetooth hands-free device is found through the search. In other words, the terminal determines whether there is an audio Bluetooth hands-free device among one or more Bluetooth devices from which response packets are received. Here, the terminal determines if there is an audio Bluetooth hands-free device using a COD parameter within the response packet. That is, the terminal identifies audio capabilities through a bit value of an MSC included within the COD parameter, and identifies hands-free device capabilities through a bit value of an MDCF. If the audio Bluetooth hands-free device is not found, the terminal terminates the procedure of an exemplary embodiment of the present invention. At this time, the terminal may display a screen for informing a user that the dual hands-free connection failed.

Figure 3F:
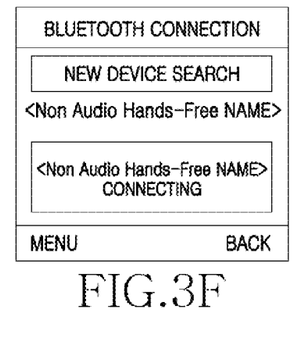

On the other hand, if the audio Bluetooth hands-free device is found, the terminal proceeds to step 225 and attempts pairing with the found audio Bluetooth hands-free device. That is, the terminal attempts pairing by transmitting previously stored pin codes to the found audio Bluetooth hands-free device in a regular sequence. At this time, the terminal attempts pairing with a device having the maximum RSSI among the audio Bluetooth hands-free devices. In more detail, if a plurality of devices are found, the terminal measures an RSSI of each of the devices and then, prioritizes the devices in order of a magnitude of the RSSI. The terminal then attempts pairing with the audio Bluetooth hands-free device having the maximum RSSI. At this time, the terminal may display a screen for informing that it is pairing as exemplified in FIG. 3F.

Next, the terminal proceeds to step 227 and determines whether the pairing succeeds. If the pin code transmitted in step 211 is matched with a pin code of the audio Bluetooth hands-free device, the pairing succeeds and, if not matched, the pairing fails.

If the pairing fails, in step 229, the terminal sends a request for a pin code to a user, and identifies the pin code input by the user. After that, the terminal returns to step 225 and again attempts pairing using the pin code input by the user.

On the other hand, if the pairing succeeds, the terminal proceeds to step 219 and connects with the found audio Bluetooth hands-free device. By this, the terminal connects with all of the non-audio Bluetooth hands-free device and the audio Bluetooth hands-free device.

After that, although not illustrated, upon a change of a control state, the terminal transmits state information to the connected two Bluetooth hands-free devices. Upon call connection, the terminal sends a request for a connection of an audio channel only to the audio Bluetooth hands-free device.

Exemplary embodiments of the present invention can address the phenomenon of unreasonably wasting a non-occupied audio channel, by simultaneously connecting with a non-audio Bluetooth hands-free device and an audio Bluetooth hands-free device in a terminal using an audio channel.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for connecting with Bluetooth hands-free devices in a terminal using an audio channel, the method comprising:

transmitting inquiry packets for searching a Bluetooth hands-free devices;

in response to the inquiry packets, receiving response packets including connecting information from each of the searched plurality of Bluetooth hands-free devices, wherein the connecting information includes Classes Of Device (COD) for determining whether the Bluetooth hands-free device has audio capabilities;

identifying whether each of the plurality of Bluetooth hands-free devices has audio capabilities by using the connecting information, respectively;

performing a connection with the plurality of Bluetooth hands-free devices; and upon call reception, sending a request for a connection of an audio channel to at least one audio Bluetooth hands-free device from among the connected plurality of Bluetooth hands-free devices and allocating the audio channel to the at least one audio Bluetooth hands-free device while maintaining the connection with non-audio Bluetooth hands-free devices from among the connected plurality of Bluetooth hands-free devices, wherein the performing the connection comprises:
measuring a Received Signal Strength Indicator (RSSI) of each of at least one Bluetooth hand-free device transmitting the at least one response packet;
performing pairing with one of a non-audio Bluetooth hand-free device having a maximum RSSI from among at least one non-audio Bluetooth hands-free device; and
performing pairing with one of an audio Bluetooth hand-free device having a maximum RSSI from among at least one audio Bluetooth hands-free device,
wherein the audio Bluetooth hands-free device indicates a Bluetooth hands-free device having the audio capabilities, and
wherein the non-audio Bluetooth hands-free device indicates another Bluetooth hands-free device except for the audio Bluetooth hands-free device among the connected plurality of Bluetooth hands-free devices.

2. The method of claim 1, wherein the attempting of the pairing comprises attempting pairing with one of the plurality of Bluetooth hands-free devices using a previously stored pin code.

3. The method of claim 2, wherein the attempting of the pairing comprises:
if the pairing using the previously stored pin code fails, requesting a user to input a pin code; and
attempting pairing again using the pin code input by the user.

4. The method of claim 1, wherein the identifying of whether each of the plurality of Bluetooth hands-free devices has audio capabilities comprises determining whether each of the plurality of Bluetooth hands-free devices has audio capabilities based on a bit value of a Major Service Class (MSC) that is included in the COD.

5. The method of claim 4, wherein the identifying of whether each of the plurality of Bluetooth hands-free devices has audio capabilities comprises determining whether each of the plurality of Bluetooth hands-free devices has hands-free capabilities based a bit value of a Minor Device Class Field (MDCF) that is included in the COD.

6. The method of claim 1, further comprising:
after the identifying of whether each of the plurality of Bluetooth hands-free devices has audio capabilities, measuring a Received Signal Strength Indicator (RSSI) of each of at least one Bluetooth device transmitting at least one response packet; and
requesting a remote name of one of a device having the maximum RSSI from among the plurality of Bluetooth hands-free devices.

7. The method of claim 6, further comprising:
determining that the request of the remote name fails if the remote name is not received within an amount of time corresponding to a page time-out value.

8. A terminal apparatus using an audio channel, the apparatus comprising:
a controller configured to control transmitting of inquiry packets for searching a Bluetooth hands-free devices, in response to the inquiry packets, to receive response packets including connecting information from each of the searched plurality of Bluetooth hands-free devices, to identify whether each of the plurality of Bluetooth hands-free devices has audio capabilities by using the connecting information respectively, and to perform a connection with the plurality of Bluetooth hands-free devices, wherein the connecting information includes a Classes of Device (COD) for determining whether the Bluetooth hands-free devices have audio capabilities; and
a Bluetooth channel manager configured to, upon call reception, send a request for a connection of an audio channel to at least one of an audio Bluetooth hands-free device from among the connected plurality of Bluetooth hands-free devices and to allocate the audio channel to the at least one audio Bluetooth hands-free device while maintaining the connection with non-audio Bluetooth hands-free devices from among the connected plurality of Bluetooth hands-free devices,
wherein the Bluetooth channel manager is further configured to:
measure a Received Signal Strength Indicator (RSSI) of each of at least one Bluetooth hand-free device transmitting the at least one response packet,
perform pairing with one of a non-audio Bluetooth hand-free device having a maximum RSSI from among at least one non-audio Bluetooth hands-free device, and
perform pairing with one of an audio Bluetooth hand-free device having a maximum RSSI from among at least one audio Bluetooth hands-free device,
wherein the audio Bluetooth hands-free device indicates a Bluetooth hands-free device having the audio capabilities, and
wherein the non-audio Bluetooth hands-free device indicates another Bluetooth hands-free device except for the audio Bluetooth hands-free device among the connected plurality of Bluetooth hands-free devices.

9. The apparatus of claim 8, wherein the controller is configured to attempt pairing with the one of the device having the maximum RSSI from among the plurality of Bluetooth hands-free devices using a previously stored pin code.

10. The apparatus of claim 9, wherein, if the pairing using the previously stored pin code fails, the controller is configured to request a user to input a pin code, and to again attempt pairing using the pin code input by the user.

11. The apparatus of claim 8, wherein the controller is configured to determine whether each of the plurality of Bluetooth hands-free devices has audio capabilities based at least on a bit value of a Major Service Class (MSC) that is included in the COD.

12. The apparatus of claim 11, wherein the controller is configured to determine whether each of the plurality of Bluetooth hands-free devices has hands-free capabilities based on at least a bit value of a Minor Device Class Field (MDCF) that is included in the COD.

13. The apparatus of claim 8, wherein the controller is configured to measure a Received Signal Strength Indicator (RSSI) of each of at least one Bluetooth device transmitting the at least one response packet; and to attempt to request a remote name of one of a device having the maximum RSSI from among the plurality of Bluetooth hands-free devices.

14. The apparatus of claim 13, wherein the controller is configured to determine that the request of the remote name fails if the remote name is not received within an amount of time corresponding to a page time-out value.

* * * * *